US011863834B2

(12) United States Patent
Chundi et al.

(10) Patent No.: US 11,863,834 B2
(45) Date of Patent: Jan. 2, 2024

(54) SYSTEMS AND METHODS FOR RECOMMENDING CONTENT USING PROGRESS BARS

(71) Applicant: Rovi Guides, Inc., San Jose, CA (US)

(72) Inventors: Charishma Chundi, Andhra Pradesh (IN); Susanto Sen, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/619,023

(22) PCT Filed: May 5, 2020

(86) PCT No.: PCT/US2020/031431
§ 371 (c)(1),
(2) Date: Dec. 14, 2021

(87) PCT Pub. No.: WO2021/225581
PCT Pub. Date: Nov. 11, 2021

(65) Prior Publication Data
US 2023/0052033 A1    Feb. 16, 2023

(51) Int. Cl.
*H04N 21/472*    (2011.01)
*H04N 21/482*    (2011.01)
*H04N 21/8352*    (2011.01)
*H04N 21/845*    (2011.01)

(52) U.S. Cl.
CPC ... *H04N 21/4826* (2013.01); *H04N 21/47217* (2013.01); *H04N 21/8352* (2013.01); *H04N 21/8456* (2013.01)

(58) Field of Classification Search
CPC ......... H04N 21/4826; H04N 21/47217; H04N 21/8352; H04N 21/8456; H04N 21/4756; H04N 21/4788; H04N 21/4884; H04N 21/4312; H04N 21/4394; H04N 21/44008; H04N 21/84
See application file for complete search history.

(56) References Cited

U.S. PATENT DOCUMENTS 8,443,388 B2 * 5/2013 Hong .................... H04N 7/163
725/39
10,511,890 B1   12/2019 Ramesh
(Continued)

OTHER PUBLICATIONS

International Search Report and Written Opinion of PCT/US2020/031431 dated Aug. 24, 2020.

*Primary Examiner* — John R Schnurr
(74) *Attorney, Agent, or Firm* — Haley Guiliano LLP

(57) ABSTRACT

During playback of a content item, a media signature corresponding to a first portion of the content item is identified. A number of media signatures representing portions of a plurality of other content items may have been previously identified and stored. Each stored media signature may also include an identifier of an associated content item and a timestamp corresponding to a position in the associated content item at which the signature is located. If it is determined that the identified media signature matches a stored media signature, a progress bar is generated for display comprising an identifier of the content item associated with the matching stored media signature, and a progress indicator corresponding to a timestamp associated with the stored media signature.

18 Claims, 10 Drawing Sheets

(56) References Cited

U.S. PATENT DOCUMENTS

| | | | |
|---|---|---|---|
| 2006/0048184 A1* | 3/2006 | Poslinski | H04N 21/4542 348/E5.112 |
| 2007/0110393 A1* | 5/2007 | Jang | H04N 5/76 386/292 |
| 2009/0116817 A1* | 5/2009 | Kim | H04N 21/4312 386/239 |
| 2014/0137165 A1* | 5/2014 | Yamagishi | H04N 21/44008 725/78 |
| 2014/0208355 A1* | 7/2014 | Gregov | H04N 21/25866 725/40 |
| 2016/0182962 A1* | 6/2016 | Peterson | H04N 21/8455 725/40 |
| 2016/0182965 A1* | 6/2016 | Peterson | H04N 21/4312 725/37 |
| 2017/0251249 A1 | 8/2017 | Seo et al. | |
| 2021/0092474 A1* | 3/2021 | Koh | G06F 16/00 |

* cited by examiner

SYSTEMS AND METHODS FOR RECOMMENDING CONTENT USING PROGRESS BARS

CROSS-REFERENCE TO RELATED APPLICATIONS

This application is a national stage application under 35 U.S.C. § 371 of International Application PCT/US2020/031431, filed May 5, 2020, the disclosure of which is hereby incorporated by reference herein in its entirety.

BACKGROUND

This disclosure relates to dynamic generation of content recommendations during content playback and, in particular, generating content recommendations using progress bars.

SUMMARY

With the proliferation of user-generated content platforms, users are more frequently consuming content items that contain clips or portions of other content items, such as in the form of a review or compilation. For example, a movie review video may include clips from several recent movies that the user may be interested in watching. Conventional content systems present recommendations for viewing the source material from which the clips are taken by displaying content links to the user in a separate panel or display area. This method, however, does not correlate each recommendation with a specific clip, leaving the user to guess which recommendation to select. This method can also reduce or limit the size of the display area in which the content item can be presented. Thus, a system is needed in which content recommendations are displayed in a manner that correlates each recommendation with the clip to which it pertains while requiring a minimum of space in the display area.

Systems and methods are described herein for dynamically generating content recommendations during playback of content. During playback of a content item, a media signature corresponding to a first portion of the content item is identified. For example, a discrete scene in a video or a song or portion of dialogue may be identified as a media signature. A number of media signatures representing portions of a plurality of other content items may have been previously identified and stored either on a local device or remotely. Each stored media signature may also include an identifier of an associated content item and a timestamp corresponding to a position in the associated content item at which the signature is located. If it is determined that the identified media signature matches a stored media signature, a progress bar is generated for display comprising an identifier of the content item associated with the matching stored media signature, and a progress indicator corresponding to a timestamp associated with the stored media signature. For example, if a movie review video contains a clip located at 1:16:54 in the movie "Avengers: Endgame," a progress bar representing the full duration of "Avengers: Endgame" is displayed, with a progress indicator at a position corresponding to the time 1:16:54, and a caption or other text portion containing the words "Avengers: Endgame."

It is possible for the identified media signature to match more than one stored media signature. For example, the user may be watching a movie review video discussing several movies. The media signature of a clip contained in the movie review video may match with stored media signatures from the source movie (e.g., "Avengers: Endgame") as well as several other review videos or "Avengers" compilation videos. In response to determining that the identified media signature matches more than one stored media signature, a progress bar recommendation is generated for each matching stored media signature.

If, during playback of the content item (i.e., the movie review of the example above), a media signature of a second portion of the content item is determined to match another stored media signature, a second progress bar recommendation is displayed. The second recommendation may replace the first or may be displayed in addition to the first. In some cases, multiple progress bar recommendations may be displayed in a scrollable area in order to occupy less space in the display area. Each progress bar may be selectable, allowing the user to access the content item associated with the matching stored media signature.

In some embodiments, a progress bar related to the content item may be segmented into different portions corresponding to, or contain indicators identifying the position of, each of a number of media signatures in the content item for which there is a matching stored media signature. Each segment or indicator may, for example, contain the title of the content item associated with the matching stored media signature. Each segment or indicator may also be selectable, allowing the user to access the content item associated with the matching stored media signature. If playback of the content item is within a portion corresponding to a particular media signature, an additional progress bar may be displayed for the content item associated with the particular media signature, and may enable the user to play back the associated content item, either from the beginning or from the point at which the media signature is located. Additionally, other trick-play options for the associated content item may be activated through interaction with the additional progress bar.

In addition to allowing access to the associated content item, selection of a progress bar may also allow the user to perform a number of other functions. For example, selection of the progress bar may allow the user to perform trick play functions for the associated content item, including rewind, fast forward, scene selection, etc. Selection of the progress bar may also enable the user to "like" or "dislike" the associated content item, or at least the portion of the associated content item corresponding to the matching stored media signature. As another example, the user may be able to share the associated content item via a social media platform. The user may also be able to add the associated content item to a watch list for later viewing, purchase the associated content item, or subscribe to the content provider through which the associated content item was published.

In cases where a content item contains many clips with matching stored media signatures, retaining display of all progress bar recommendations, even in a scrollable area, may be overly confusing for a user. Display of each progress bar may be timed such that after a threshold period of time after the end of the portion of the content item corresponding to the media signature the progress bar is removed from the display.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
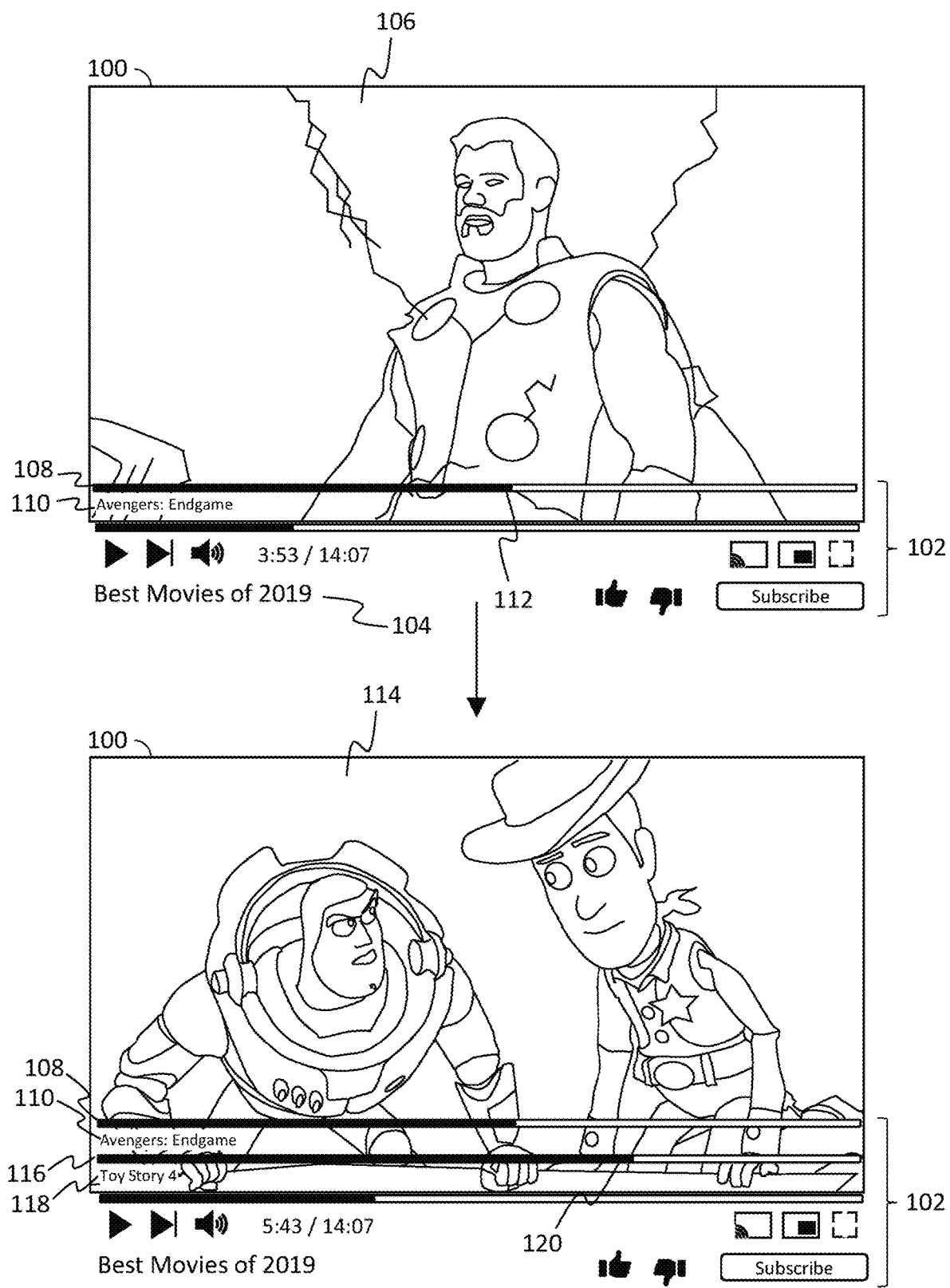
FIG. 1 shows an exemplary display and user interface for dynamically generating content recommendations during content playback, in accordance with some embodiments of the disclosure.

FIG. 1 shows an exemplary display 100 and user interface 102 for dynamically generating content recommendations during content playback, in accordance with some embodiments of the disclosure. Display 100 may be any display device, such as a television, a computer monitor, or a touchscreen such as is found on a tablet or smartphone device. Content item 104, entitled "Best Movies of 2019," is a content item that includes portions of several movies released in 2019. A media signature is identified for portion 106, and it is determined to match a stored media signature associated with the movie "Avengers: Endgame." In response to this determination, a recommendation for the movie "Avengers: Endgame" is presented in the form of progress bar 108. Progress bar 108 represents the full duration of the movie "Avengers: Endgame" and includes a caption or text portion 110 identifying the content item being recommended as "Avengers: Endgame." A progress indicator 112 of progress bar 108 corresponds to the position within the movie at which the matching stored media signature is located.

As playback of content item 104 continues, a second media signature is identified for portion 114, which is determined to match a stored media signature associated with the movie "Toy Story 4." In response to this determination, display of progress bar recommendation 108 and associated text portion 110 is moved up, and a recommendation for the movie "Toy Story 4" is presented in the form of a second progress bar 116. Like progress bar 108, progress bar 116 represents the full duration of the movie "Toy Story 4," and includes a caption or text portion 118 identifying the recommended content item as the movie "Toy Story 4." Progress indicator 120 of progress bar 116 represents the position with the movie "Toy Story 4" at which the matching stored media signature is located.

Figure 2:
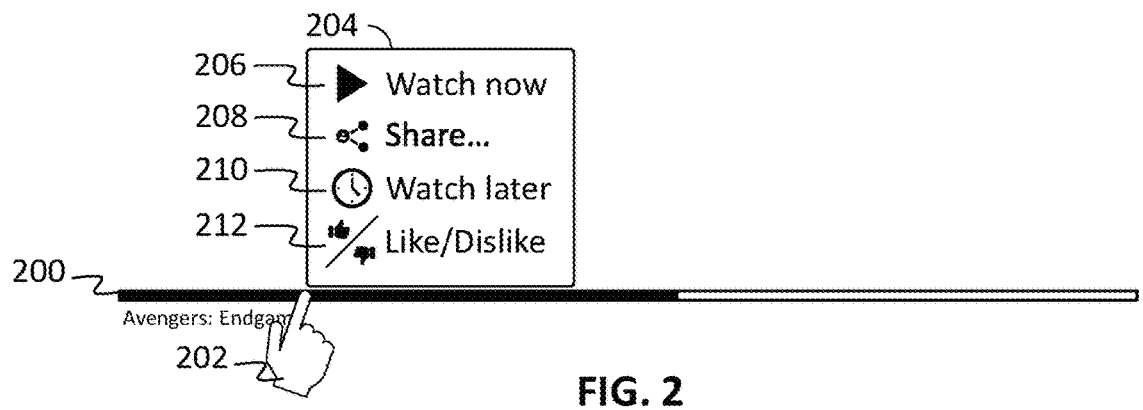
FIG. 2 shows an exemplary progress bar recommendation and user interaction therewith, in accordance with some embodiments of the disclosure.

FIG. 2 shows an exemplary progress bar recommendation 200 and user interaction therewith, in accordance with some embodiments of the disclosure. Upon user selection 202 of any portion of progress bar recommendation 200, menu 204 is displayed. Menu 204 may be displayed in a set position relative to progress bar recommendation 200 or may be displayed at or near the position at which user selection 202 is made. Menu 204 includes several options from which the user can select. A first option 206 is a "watch now" option. Selecting this option may replace playback of the currently playing content item with the recommended content item. Selection of option 206 may, in some embodiments, cause presentation of an option to begin playback of the recommended content item either from the beginning or from the position at which the matching stored media signature is located.

Option 208 is a "share" option. Selection of option 208 may allow the user to share the recommended content item on a social media platform (e.g., Facebook®, Twitter®, etc.) by generating a link to the recommended content item. The user may then be able to post the link on the social media platform. Option 210 is a "watch later" option. Selection of option 210 allows the user to bookmark or otherwise save the recommended content item or a link thereto for later viewing. Option 212 is a "like"/"dislike" option which allows the user to indicate that he or she likes or dislikes the recommended content item. Liking or disliking the recommended content item may affect future recommendations of similar content items. For example, an indication of the user's like or dislike may be stored in a user profile. When the user performs a content search, the indication may be retrieved and factored into the relevance of each search result to the user. A like or dislike of the content item may also be shared with the content creator or publisher as a type of user feedback or may be reflected in a total like counter or total dislike counter displayed concurrently with the recommended content item.

Figure 3:
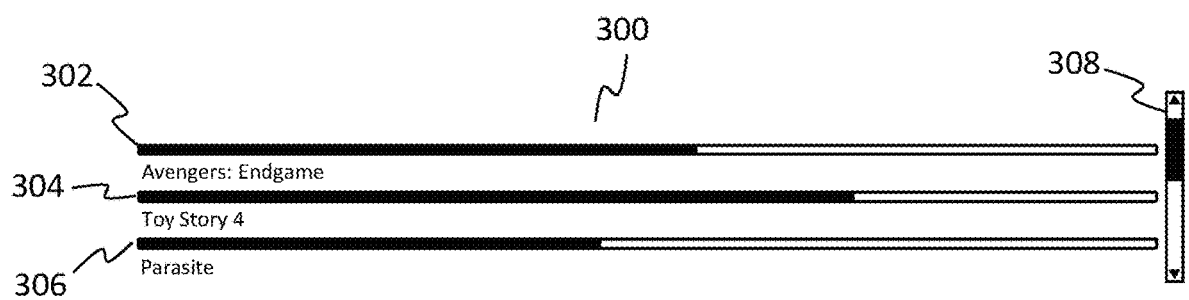
FIG. 3 shows an exemplary scrollable area containing a plurality of progress bar recommendations, in accordance with some embodiments of the disclosure.

FIG. 3 shows an exemplary scrollable area 300 containing a plurality of progress bar recommendations, in accordance with some embodiments of the disclosure. As playback of the content item progresses, media signatures of a number of portions of the content item may be determined to match stored media signatures associated with other content items. For example, during playback of the "Best Movies of 2019" content item of the above examples, media signatures matching stored media signatures for "Avengers: Endgame," "Toy Story 4," and "Parasite" may be identified. Progress bar recommendations 302, 304, and 306, representing "Avengers: Endgame," "Toy Story 4," and "Parasite," respectively, may be displayed in scrollable area 300. Using scroll control 308, the user can review all the progress bar recommendations while using a minimum of space on the display.

Figure 4:
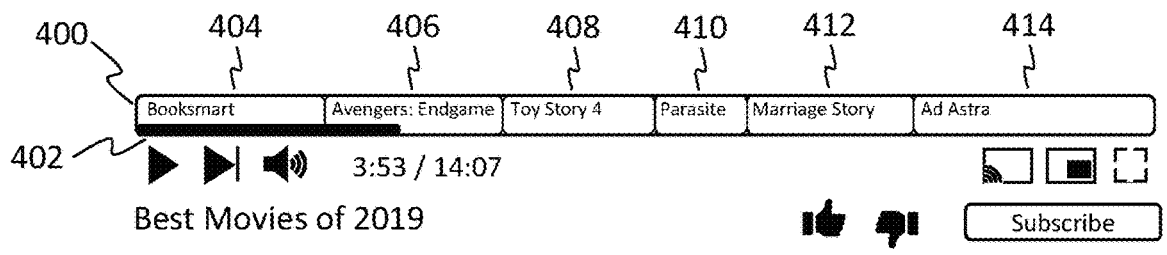
FIG. 4 shows an exemplary progress bar for a content item containing clips of other content items, in accordance with some embodiments of the disclosure.

FIG. 4 shows an exemplary progress bar 400 for a content item containing clips of other content items, in accordance with some embodiments of the disclosure. Progress bar 400 may represent the total duration of the "Best Movies of 2019" content item of the above examples. Progress bar 400 includes progress indicator 402, which represents the current playback position of the content item. Progress bar 400 is also divided into several segments 404, 406, 408, 410, 412, and 414. Each segment corresponds to a media signature identified as matching a stored media signature. Each segment includes a caption or text portion in which an identifier of the content item associated with the matching stored media signature is displayed. The user may interact with each segment in a similar manner to that described above in relation to FIG. 2.

Figure 5:
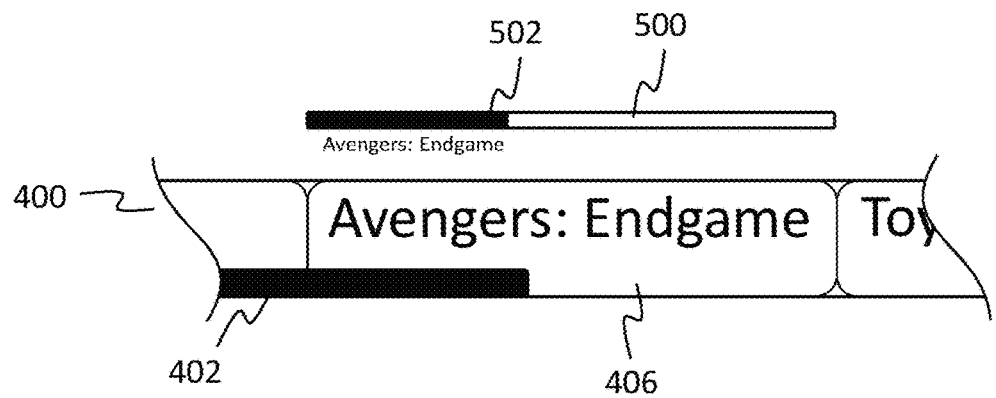
FIG. 5 shows an exemplary progress bar recommendation associated with a content item identified by a portion of a progress bar for a currently playing content item, in accordance with some embodiments of the disclosure.

FIG. 5 shows an exemplary progress bar recommendation associated with a content item identified by a portion of a progress bar for a currently playing content item, in accordance with some embodiments of the disclosure. Continuing the example of FIG. 4, in which progress bar 400 is divided into several segments, progress indicator 402 is detected as being between a start time and an end time of segment 406, which identifies a media signature associated with the movie "Avengers: Endgame." In response to the detecting, progress bar recommendation 500 is displayed. Display of progress bar recommendation 500 may be associated with and/or positioned near segment 406. The dimensions of progress bar recommendation 500 may be scaled such that the length of progress bar recommendation 500 is the same or substantially similar to the length of segment 406, as shown in FIG. 5. However, it should be understood that this is only one exemplary embodiment, and that the dimensions of progress bar recommendation 500 need not be related to the dimensions of a segment with which it is associated. Progress indicator 502 of progress bar recommendation 500 corresponds to the position in the associated content item at which the matching media signature is located. Upon selection of progress bar recommendation 500, a menu such as menu 204 may be displayed, thereby providing the user with interaction options for the associated content item, including playback of the associated content item from the position at which the matching media signature is location, playback of the associated content item from the beginning of the associated content item, trick-play functions enabling the user to begin playback of the associated content item from any position, sharing options, liking/disliking options, and bookmarking options.

Figure 6:
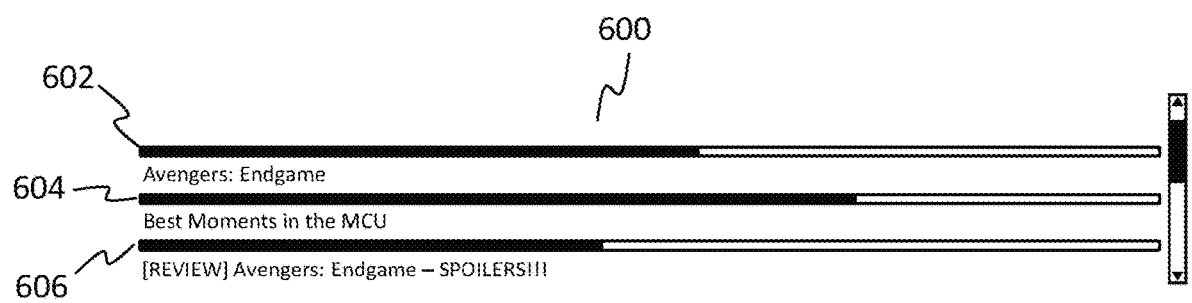
FIG. 6 shows a second exemplary scrollable area containing a plurality of progress bar recommendations matching a single media signature, in accordance with some embodiments of the disclosure.

FIG. 6 shows a second exemplary scrollable area 600 containing a plurality of progress bar recommendations matching a single media signature, in accordance with some embodiments of the disclosure. When using a content platform containing a lot of user-generated content (e.g., YouTube®), there may be many content items that include clips or portions of other content items, such as review videos and compilation videos. For example, several users may publish their own reviews of the movie "Avengers: Endgame." Other users may create compilation videos of their favorite moments from all the "Avengers" movies, including portions taken from "Avengers: Endgame." Still other users may create parody videos having a similar look and/or sound or may dub new dialogue over the original video taken from the movie "Avengers: Endgame." Each one of these content items may have a media signature which matches each other one of these content items. Each of these content items may be recommended to the user in response to determining that a media signature of the "Best Movies of 2019" content item matches a stored media signature associated with each of these content items. Recommendations 602, 604, and 606 are then displayed to the user in scrollable area 600.

Figure 7:
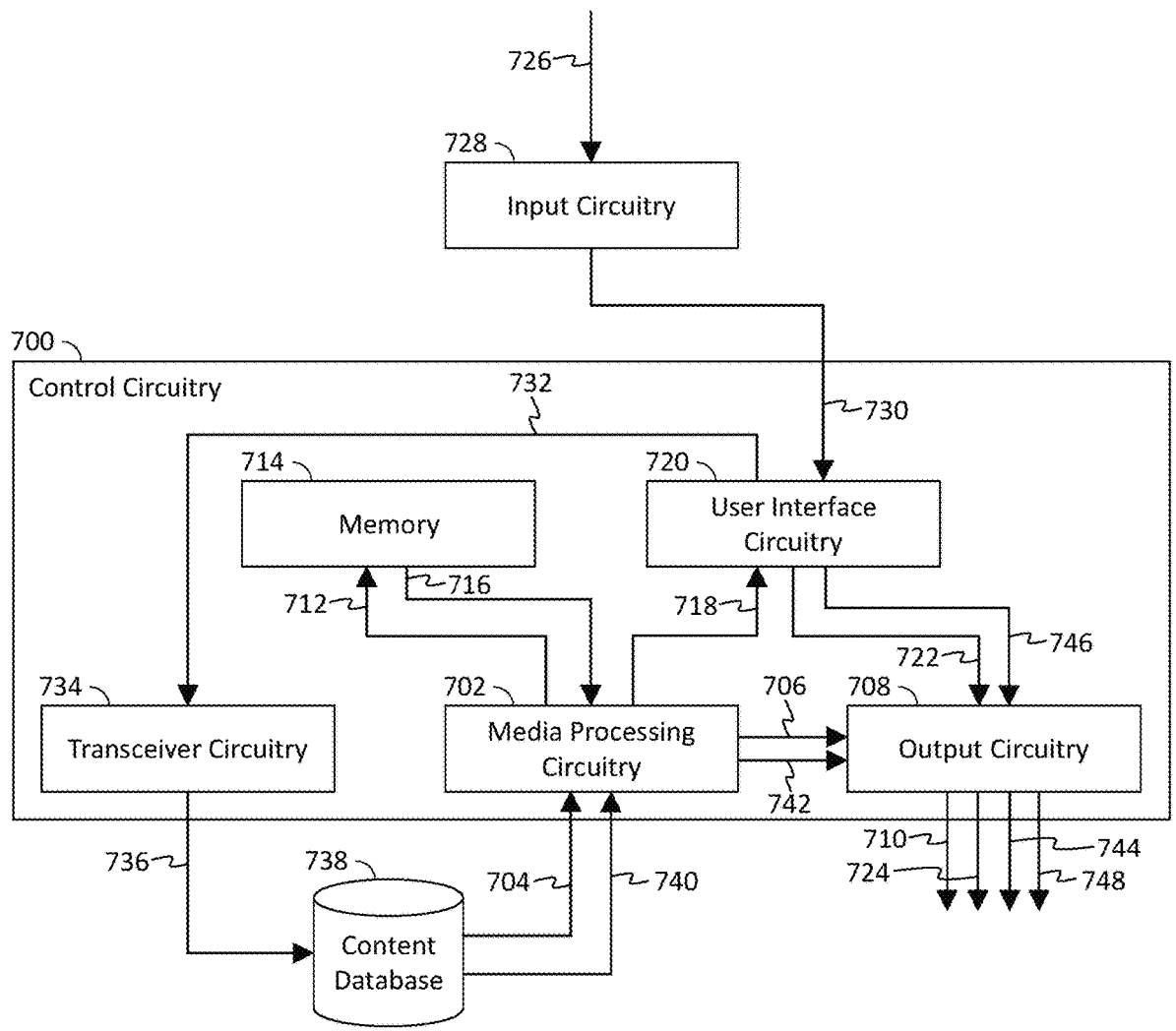
FIG. 7 is a block diagram representing components and data flow therebetween of a system for presenting content recommendations during playback of a content item, in accordance with some embodiments of the disclosure.

FIG. 7 is a block diagram representing components and data flow therebetween of a system for presenting content recommendations during playback of a content item, in accordance with some embodiments of the disclosure. Control circuitry 700, using media processing circuitry 702, receives 704 a content item. Control circuitry 700 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 702 may be any suitable circuitry for decoding a media stream for output. Media processing circuitry 702 may also be configured to perform media analysis such as waveform analysis of audio data, and image processing functions such as facial recognition, object recognition, edge detection, and character recognition of individual frames of video data, and object tracking across multiple frames of video data. Media processing circuitry 702 decodes the content item and transmits 706 the decoded media data to output circuitry 708. Output circuitry 708 may be any video or graphics processing circuitry suitable for generating an image for display on a display device associated with control circuitry 700, and/or any audio processing circuitry suitable for generating an audio signal for output using a speaker or other audio device associated with control circuitry 700. Output circuitry 708 then outputs 710 the decoded media.

During playback of the content item, media processing circuitry 702 analyzes the media data of the content item to identify media signatures for portions of the content item. When a media signature has been identified, media processing circuitry 702 transmits 712 a query to memory 714 to determine if any media signatures stored in memory 714 match the identified media signature. Memory 714 may be an electronic storage device such as random-access memory, read-only memory, hard drives, optical drives, solid state devices, quantum storage devices, or any other suitable fixed or removable storage devices, and/or any combination of the same. A database or other data structure may be stored in memory 714 containing the stored media signatures and relationships between each media signature and various content items. If any stored media signature matches the identified media signature, media processing circuitry 702 receives 716 an identifier of the content item associated with the matching stored media signature, as well as a timestamp corresponding to the position within the associated content item at which the stored media signature is located.

In response to receiving this data, media processing circuitry 702 transmits 718 a command to user interface circuitry 720 to generate progress bar recommendations for each of the content items associated with stored media signatures matching the identified media signature. User interface circuitry 720 generates the progress bar recommendations accordingly and transmits 722 a video signal or image data of each progress bar recommendation to output circuitry 708. If multiple progress bar recommendations are generated, user interface circuitry may also generate a scrollable user interface element in which to display the progress bar recommendations. Output circuitry 708 then processes the progress bar recommendations for overlay over the content item and outputs 724 the progress bar recommendations for display.

A user interaction is received 726 using input circuitry 728. Input circuitry 728 may be a physical connection with a user input device, such as a keyboard or mouse, a touchscreen interface, or a wired or wireless data connection suitable for receiving user input from another device (e.g., Ethernet, WiFi, or Bluetooth). Input circuitry 728 may convert the user interaction into a signal that can be understood by user interface circuitry 720. For example, input circuitry 728 may identify a set of coordinates within the display corresponding to a position at which the user interaction was received and encode the coordinates in a data packet or electrical signal. Input circuitry 728 transmits 730 the received user selection or the corresponding converted signal to user interface circuitry 720. User interface circuitry 720 determines whether the user selected a progress bar recommendation and, if so, retrieves the identifier of the content item associated with the selected progress bar recommendation and transmits 732 a request for the identified content item to transceiver circuitry 734. Transceiver circuitry 734 comprises a network connection over which data can be transmitted to and received from remote devices, such as an ethernet connection, WiFi connection, or connection employing any other suitable networking protocol. Transceiver circuitry 734 in turn transmits 736 the request to a content database 738 from which the identified content item is available. In response to the request, media processing circuitry 702 receives 740 the identified content item from content database 738. Media processing circuitry 702 decodes the received content item as described above and transmits 742 the decoded media data to output circuitry 708, which in turn outputs 744 the decoded media.

In some embodiments, a menu is displayed in response to selection of a progress bar recommendation, as described above in connection with FIG. 2. Upon determining that the user selected a progress bar recommendation, user interface circuitry 720 generates for display a menu including several options that the user can select. User interface circuitry 720 transmits 746 a video signal or image data of the menu to output circuitry 708, which outputs 748 the menu as an overlay over the content item.

Figure 8:
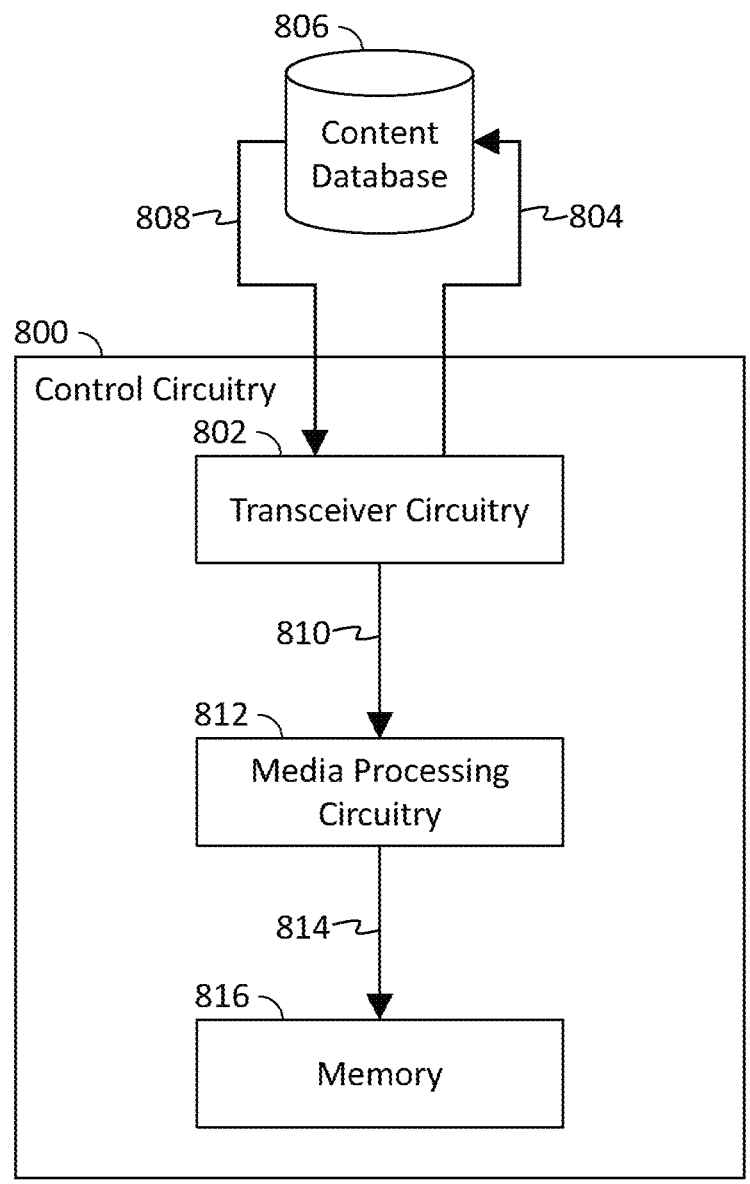
FIG. 8 is a block diagram representing components and data flow therebetween of a system for identifying media signatures in a plurality of content items and storing such identified media signatures, in accordance with some embodiments of the disclosure.

FIG. 8 is a block diagram representing components and data flow therebetween of a system for identifying media signatures in a plurality of content items and storing such identified media signatures, in accordance with some embodiments of the disclosure. Control circuitry 800, using transceiver circuitry 802, transmits 804 a request for a plurality of content items to content database 806. Like control circuitry 700, control circuitry 800 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Control circuitry 800 may be combined with control circuitry 700 or may be separate. Transceiver circuitry 802, similar to transceiver circuitry 734, comprises a network connection over which data can be transmitted to and received from remote devices, such as an ethernet connection, WiFi connection, or connection employing any other suitable networking protocol.

In response to the query, control circuitry 800, using transceiver circuitry 802, receives 808 the requested plurality of content items. The content items may be requested and received one at a time or in a batch. If requested and/or received in a batch, transceiver circuitry 802 may buffer or otherwise temporarily store all but one content item to be processed as described below. After processing of the content item is complete, a second content item may be released from the buffer for processing. This may continue until all content items have been processed as described below.

Transceiver circuitry 802 transmits 810 a content item of the plurality of content items to media processing circuitry 812. Media processing circuitry 812 may be similar to or combined with media processing circuitry 702. Media processing circuitry 812 performs media analysis of the content item. For example, media processing circuitry 812 may perform image analysis, edge detection, object recognition, facial recognition, audio waveform analysis, or any other suitable media processing function to identify media signatures within the content item. Upon identifying a media signature, media processing circuitry transmits 814 the media signature, in association with an identifier of the content item, at least a starting timestamp corresponding to the position in the content item at which the media signature begins, and optionally an ending timestamp corresponding to the position in the content time at which the media signature ends, to memory 816 for storage. Memory 816 may be similar to or combined with memory 714.

Figure 9:
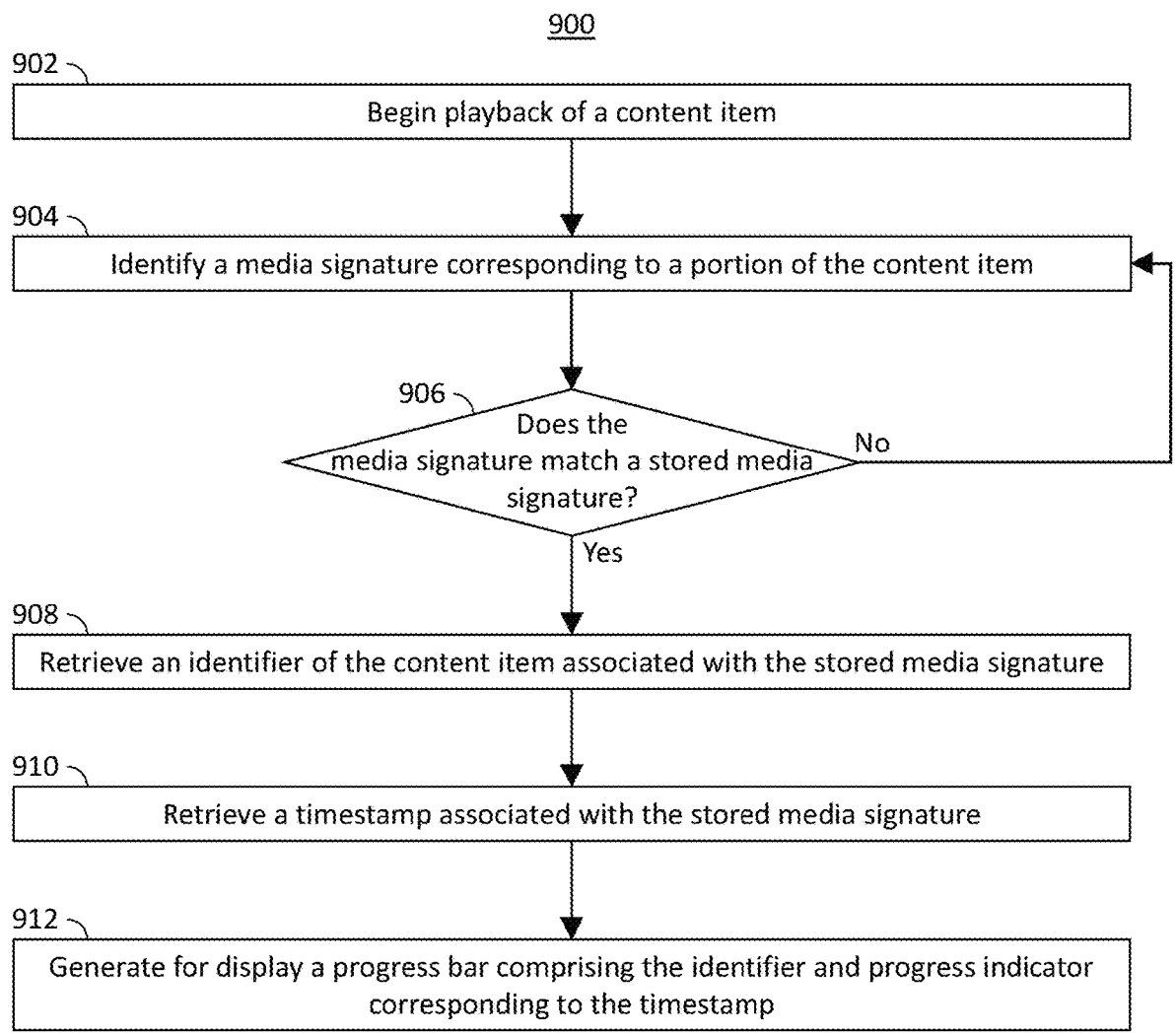
FIG. 9 is a flowchart representing a process for recommending a content item using a progress bar, in accordance with some embodiments of the disclosure.

FIG. 9 is a flowchart representing an illustrative process 900 for recommending a content item using a progress bar, in accordance with some embodiments of the disclosure. Process 900 may be implemented on control circuitry 700. In addition, one or more actions of process 900 may be incorporated into or combined with one or more actions of any process or embodiments described herein.

At 902, control circuitry 700 begins playing back a content item. For example, a content item "Best Movies of 2019" may be received and processed by media processing circuitry 702 for output to a display. At 904, control circuitry 700, using media processing circuitry 702, identifies a media signature corresponding to a portion of the content item. For example, using media analysis techniques listed above, media processing circuitry 702 may identify a portion of the content item and a discrete scene or portion of dialogue.

At 906, control circuitry 700 determines whether the identified media signature matches any stored media signatures. If not ("No" at 906), then processing returns to step 904. If the media signature does match a stored media signature ("Yes" and 906), then, at 908, control circuitry 700 retrieves an identifier of the content item associated with the matching stored media signature and, at 910, retrieves a timestamp associated with the matching stored media signature. For example, the stored media signature may be stored in a relational database or other data structure in association with an identifier of the content item from which the stored media signature was originally identified, and timestamp information describing the position in that content item at which the media signature is located (a process described in further detail below in connection with FIGS. 12-13). At 912, control circuitry 700 generates for display a progress bar recommendation comprising the identifier of the content item from which the matching stored media signature was originally identified, and a progress indicator corresponding to the timestamp associated with the matching stored media signature. For example, a media signature is identified and determined to match a stored media signature for a portion of the movie "Avengers: Endgame" beginning at one hour, sixteen minutes, and fifty-four seconds into the movie. The stored media signature is associated with an identifier of the movie "Avengers: Endgame" and a timestamp 1:16:54. A progress bar recommendation is generated with the length of the progress bar representing the total duration of the movie "Avengers: Endgame" and a progress indicator placed at a position along the progress bar corresponding to one hour, sixteen minutes, and fifty-four seconds into the movie.

The actions or descriptions of FIG. 9 may be used with any other embodiment of this disclosure. In addition, the actions and descriptions described in relation to FIG. 9 may be done in any suitable alternative orders or in parallel to further the purposes of this disclosure.

Figure 10:
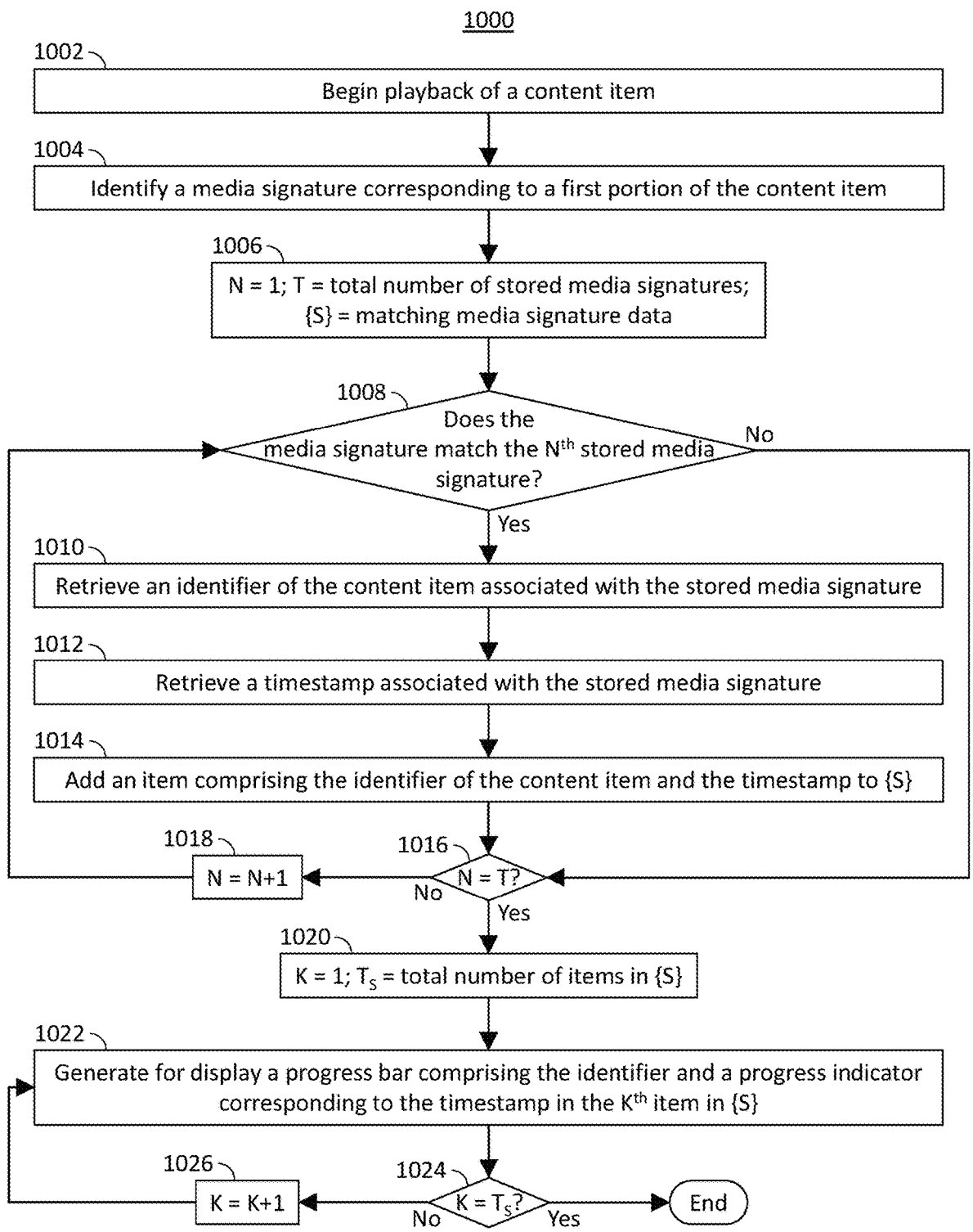
FIG. 10 is a flowchart representing a process for identifying content items to recommend based on media signatures of a content item and generating a progress bar recommendation for each content item having a matching media signature, in accordance with some embodiments of the disclosure.

FIG. 10 is a flowchart representing an illustrative process 1000 for identifying content items to recommend based on media signatures of a content item and generating a progress bar recommendation for each content item having a matching media signature, in accordance with some embodiments of the disclosure. Process 1000 may be implemented on control circuitry 700. In addition, one or more actions of process 1000 may be incorporated into or combined with one or more actions of any process or embodiments described herein.

At 1002, control circuitry 700 begins playing back a content item, such as "Best Movies of 2019" as in the example above and, at 1004, identifies a media signature in the content item. At 1006, control circuitry 700 initializes a counter variable N, setting its value to one, a variable T representing the total number of stored media signatures, and a data structure {S} for data of matching stored media signatures.

At 1008, control circuitry 700 determines whether the identified media signature matches the $N^{th}$ stored media signature. If so ("Yes" at 1008), then, at 1010, control circuitry 700 retrieves an identifier of the content item associated with the stored media signature and, at 1012, retrieves a timestamp associated with the stored media signature, as described above in connection with FIG. 9. At 1014, control circuitry 700 adds an item to {S} comprising the retrieved identifier and timestamp associated with the $N^{th}$ store media signature.

At 1016, after adding the item to {S} or if the identified media signature does not match the $N^{th}$ stored media signature ("No" at 1008), control circuitry 700 determines whether N is equal to T, meaning that all stored media signatures have been processed. If not ("No" at 1016), then, at 1018, control circuitry 700 increments that value of N by one, and processing returns to step 1008.

If N is equal to T, then, at 1020, control circuitry 700 initializes a second counter variable K, setting its value to one, and a variable $T_S$ representing the total number of items in {S}. At 1022, control circuitry 700 generates for display a progress bar recommendation comprising the identifier and a progress indicator corresponding to the timestamp of the $K^{th}$ item in {S}. At 1024, control circuitry 700 determines whether K is equal to $T_S$, meaning that progress bar recommendations for all items in {S} have been generated for display. If not ("No" at 1024, then, at 1026, control circuitry 700 increments the value of K by one, and processing returns to step 1022. If K is equal to $T_S$ ("Yes" at 1024), then the process is complete.

The actions or descriptions of FIG. 10 may be used with any other embodiment of this disclosure. In addition, the actions and descriptions described in relation to FIG. 10 may be done in any suitable alternative orders or in parallel to further the purposes of this disclosure.

Figure 11:
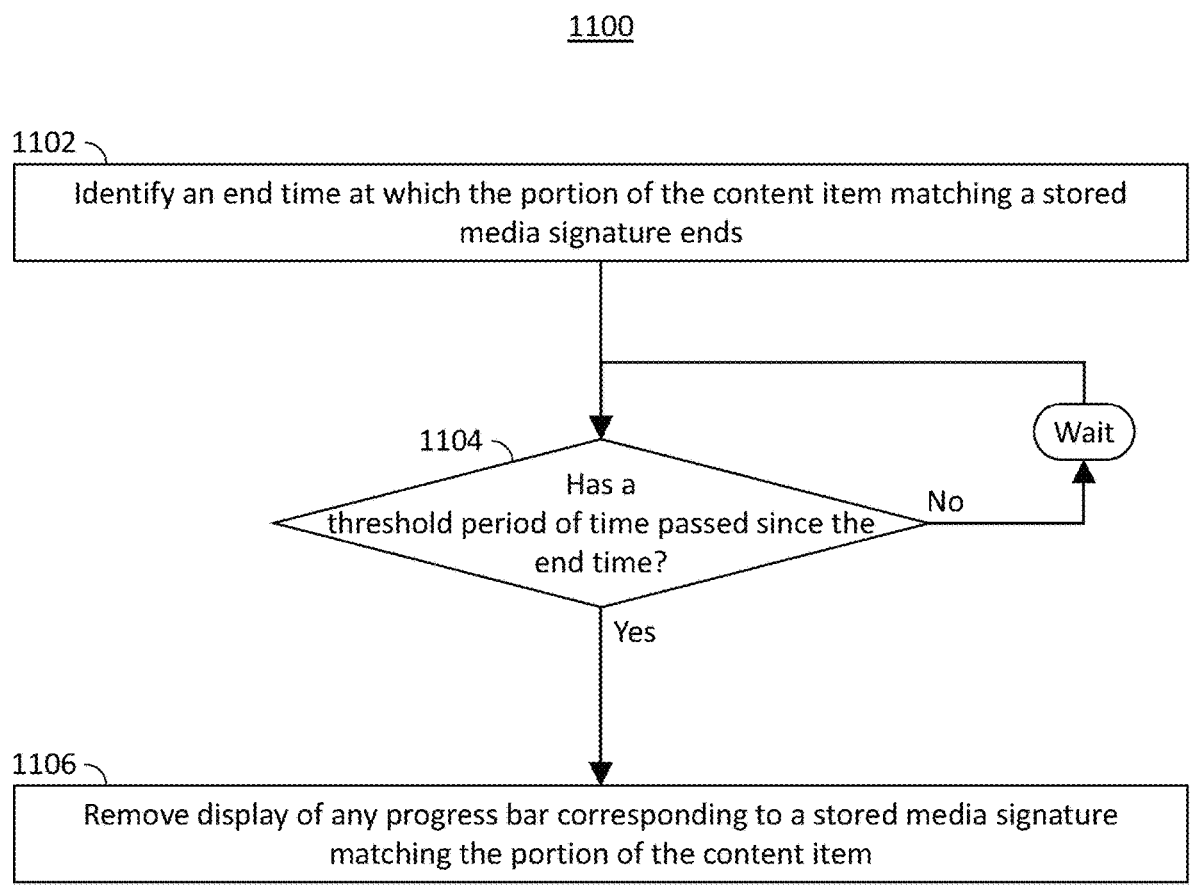
FIG. 11 is a flowchart representing a process for removing display of a progress bar recommendation after a period of time, in accordance with some embodiments of the disclosure.

FIG. 11 is a flowchart representing an illustrative process 1100 for removing display of a progress bar recommendation after a period of time, in accordance with some embodiments of the disclosure. Process 1100 may be implemented on control circuitry 700. In addition, one or more actions of process 1100 may be incorporated into or combined with one or more actions of any process or embodiments described herein.

At 1102, control circuitry 700 identifies an end time at which the portion of the content item matching a stored media signature ends. For example, control circuitry 700 may, using media processing circuitry 702, preprocess at least a portion of the content item ahead of the current playback position to determine when the current portion of the content item ends, in order to generate a media signature for the current portion of the media content. Control circuitry 700 may store the identified end time.

At 1104, control circuitry 700 determines whether a threshold period of time, such as fifteen seconds, has passed since the identified end time. For example, a portion of the content item matching a stored media signature begins at one minute and has a duration of thirty seconds. At or near the one-minute position, when the media signature of that portion is identified and determined to match a stored media signature, a progress bar recommendation is displayed. At one minute and thirty seconds, the portion of the content item matching the stored media signature ends. Thus, at one minute and forty-five seconds, the threshold time will have elapsed. If the threshold period of time has not yet elapsed ("No" at 1104), then control circuitry 700 continues to wait. If the threshold amount of time has passed ("Yes" at 1104), then, at 1106, control circuitry 700, using user interface circuitry 720, removes display of the progress bar recommendation corresponding to the stored media signature.

The actions or descriptions of FIG. 11 may be used with any other embodiment of this disclosure. In addition, the actions and descriptions described in relation to FIG. 11 may be done in any suitable alternative orders or in parallel to further the purposes of this disclosure.

Figure 12:
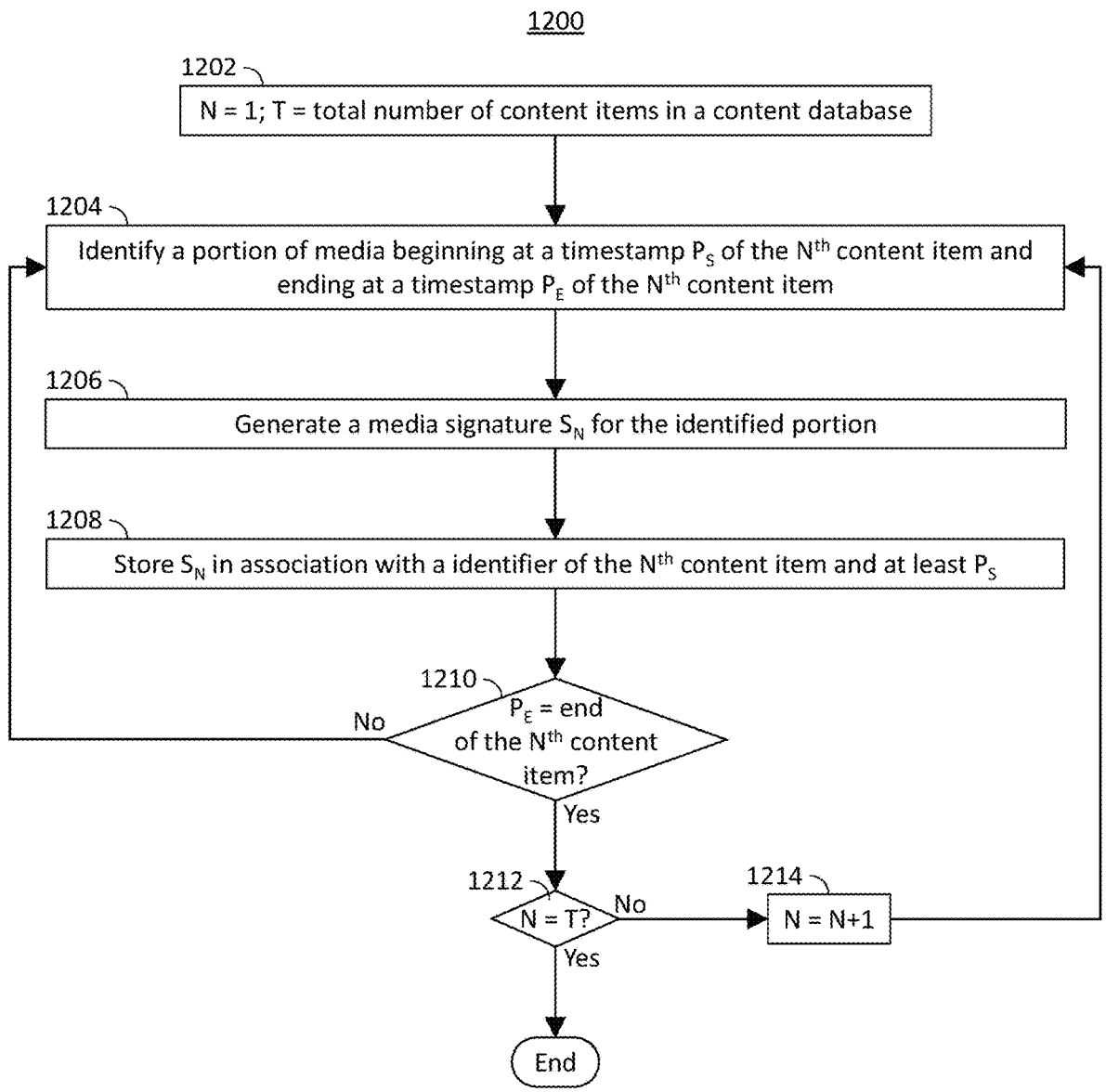
FIG. 12 is a flowchart representing a process for storing media signatures identified in content items, in accordance with some embodiments of the disclosure.

FIG. 12 is a flowchart representing an illustrative process 1200 for storing media signatures identified in content items, in accordance with some embodiments of the disclosure. Process 1200 may be implemented on control circuitry 800. In addition, one or more actions of process 1200 may be incorporated into or combined with one or more actions of any process or embodiments described herein.

At 1202, control circuitry 800 initializes a counter variable N, setting its value to one, and a variable T representing the total number of content items in a database. At 1204, control circuitry 800 identifies a portion of media beginning at a first timestamp $P_S$ of the $N^{th}$ content item and ending at an ending timestamp $P_E$ of the $N^{th}$ content item.

At 1206, control circuitry 800 generates a media signature SN for the identified portion of the $N^{th}$ content item. The media signature may be a hash value calculated from a sum or other combination of each factor considered in identifying the portion of the $N^{th}$ content item as a single media signature, such as audio waveform data, image brightness data, object identifiers, etc. At 1208, control circuitry 800 stores the media signature SN in association with an identifier of the $N^{th}$ content item and at least the starting timestamp $P_S$. Control circuitry 800 may also store the ending timestamp $P_E$.

At 1210, control circuitry 800 determines whether $P_E$ is equal to the end of the $N^{th}$ content item, meaning that there are no further portions of content to process. If not ("No" at 1210), then processing returns to step 1204. If the end of the $N^{th}$ content item has been reached ("Yes" at 1210), then, at 1212, control circuitry 800 determines whether N is equal to T, meaning that all content items in the content database have been processed. If not ("No" at 1212), then, at 1214, control circuitry 800 increments the value of N by one, and processing returns to step 1204. If N is equal to T ("Yes" at 1212), then the process is complete.

The actions or descriptions of FIG. 12 may be used with any other embodiment of this disclosure. In addition, the actions and descriptions described in relation to FIG. 12 may be done in any suitable alternative orders or in parallel to further the purposes of this disclosure.

Figure 13:
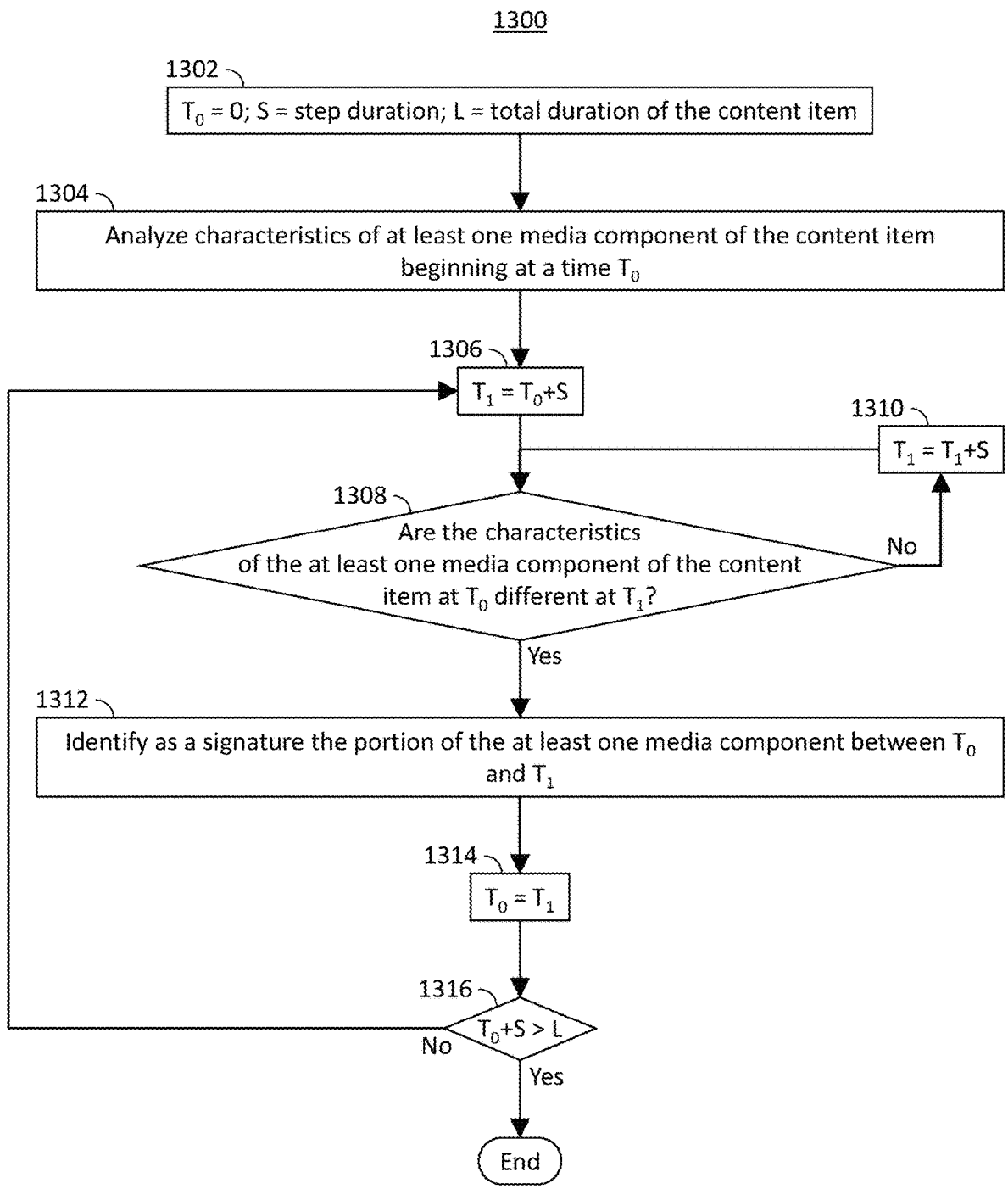
FIG. 13 is a flowchart representing a process for identifying media signatures in content items, in accordance with some embodiments of the disclosure.

FIG. 13 is a flowchart representing an illustrative process 1300 for identifying media signatures in content items, in accordance with some embodiments of the disclosure. Process 1300 may be implemented on control circuitry 800. In addition, one or more actions of process 1300 may be incorporated into or combined with one or more actions of any process or embodiments described herein.

At 1302, control circuitry 800 initializes a variable $T_0$ representing a first time in the content item, setting its value to zero; a variable S representing a step duration (e.g., one second); and a variable L representing the total duration of the content item. At 1304, control circuitry 800 analyzes characteristics of at least one media component of the content item beginning at time $T_0$. For example, control circuitry 800 may analyze a video component by performing object or facial recognition, analyze an audio component by performing waveform analysis, or both. At 1306, control circuitry 800 sets the value of a second time variable $T_1$ to the sum of $T_0$ and S.

At 1308, control circuitry 800 analyzes the media characteristics at $T_1$ to determine whether the media characteristics of the at least one component at $T_0$ are different at $T_1$. If not ("No" at 1308), meaning that the characteristics of the content item have remained similar enough to conclude that there has not been, for example, a scene change, then, at 1310, control circuitry 800 sets the value of $T_1$ to the sum of $T_1$ and S, and processing returns to step 1308. If the media characteristics are different at $T_1$ compared to $T_0$ ("Yes" at 1308), then, at 1312, control circuitry 800 identifies as a signature the portion of the at least one component of the content item between $T_0$ and $T_1$. At 1314, control circuitry 800 resets the value of $T_0$ to the value of $T_1$. At 1316, control circuitry 800 determines whether the sum of $T_0$ and S would exceed the value of L, meaning that the content item has been processed to within less than one step from the end of the content item. If not ("No" at 1316), then processing returns to step 1306. If so ("Yes" at 1316), then the process is complete.

The actions or descriptions of FIG. 13 may be used with any other embodiment of this disclosure. In addition, the actions and descriptions described in relation to FIG. 13 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. This specification discloses embodiments which include, but are not limited to, the following:

1. A method for dynamically generating content recommendations during playback of a content item, the method comprising:
   identifying, during the playback of the content item, a media signature corresponding to a first portion of the content item;
   determining whether the media signature matches any stored media signature of a plurality of stored media signatures; and
   in response to determining that the media signature matches a stored media signature, generating for display a progress bar comprising the identifier of the content item associated with the stored media signature, a progress indicator of the progress bar corresponding to the timestamp associated with the stored media signature.

2. The method of item 1, further comprising:
   for each content item of a plurality of content items:
      generating, for the respective content item, a media signature for a portion of the respective content item; and
      storing the media signature in association with an identifier of the respective content item and a timestamp corresponding to a position in the respective content item at which the portion is located.

3. The method of item 1, further comprising:
   in response to determining that the media signature matches more than one stored media signature, generating for display, for each matching stored media signature, a progress bar comprising an identifier of the respective content item associated with the respective stored media signature, a progress indicator of the progress bar corresponding to the respective timestamp associated with the respective stored media signature.

4. The method of item 1, further comprising:
    identifying, during the playback of the content item, a second media signature corresponding to a second portion of the content item;
    determining whether the second media signature matches a second stored media signature; and
    in response to determining that the second media signature matches a second stored media signature, generating for display a second progress bar comprising the identifier of the content item associated with the second stored media signature, a progress indicator of the second progress bar corresponding to the timestamp associated with the second stored media signature.

5. The method of item 4, wherein the display of the second progress bar replaces display of the progress bar.

6. The method of item 4, wherein the display of the second progress bar is in addition to display of the progress bar.

7. The method of item 6, wherein the progress bar and the second progress bar are displayed in a scrollable area.

8. The method of item 1, further comprising:
    displaying, during the playback of the content item, a second progress bar representing the total duration of the content item and including an indication of a current playback position, wherein the second progress bar comprises a plurality of sections, each section identifying a respective identified media signature.

9. The method of item 8, wherein each section of the plurality of sections has a start time and an end time, the method further comprising:
    determining that a progress indicator of the second progress bar is between the start time and the end time of a first section of the plurality of sections; and
    in response to determining that the progress indicator of the second progress bar is between the start time and the end time of the first section, generating for display a third progress bar for a content item associated with the respective identified media signature corresponding to the first section.

10. The method of item 1, further comprising:
    receiving a selection of the progress bar; and
    in response to receiving the selection of the progress bar, generating for display the respective content item beginning at the timestamp corresponding to the progress indicator.

11. The method of item 1, further comprising:
    receiving a selection of the progress bar; and
    in response to receiving the selection of the progress bar, generating for display, within the selectable user interface element, at least one selectable option to perform an action selected from the group consisting of: sharing the respective content item on social media, liking the respective content item, disliking the respective content item, subscribing to a content provider associated with the respective content item, purchasing the respective content item, and adding the respective content item to a watch list.

12. The method of item 1, further comprising:
    identifying an end time at which the first portion of content ends;
    determining whether at least a threshold period of time has passed since the end time; and
    in response to determining that at least the threshold period of time has passed since the end time, removing display of the progress bar.

13. The method of item 1, wherein generating, for the respective content item, at least one media signature for at least one portion of the respective content item comprises:
    analyzing characteristics of at least one media component of the respective content item beginning at a first timestamp;
    determining that the characteristics of the respective content item beginning at a subsequent timestamp are different from the characteristics beginning at the first timestamp; and
    identifying as a signature the portion of the at least one media component between the first timestamp and the subsequent timestamp.

14. A system for dynamically generating content recommendations during playback of a content item, the system comprising:
    memory; and
    control circuitry configured to:
        identify, during the playback of the content item, a media signature corresponding to a first portion of the content item;
        determine whether the media signature matches any stored media signature of a plurality of stored media signatures in the memory; and
        in response to determining that the media signature matches a stored media signature, generate for display a progress bar comprising the identifier of the content item associated with the stored media signature, a progress indicator of the progress bar corresponding to the timestamp associated with the stored media signature.

15. The system of item 14, wherein the control circuitry is further configured to:
    for each content item of a plurality of content items:
        generate, for the respective content item, a media signature for a portion of the respective content item; and
        store, in the memory, the media signature in association with an identifier of the respective content item and a timestamp corresponding to a position in the respective content item at which the portion is located.

16. The system of item 14, wherein the control circuitry is further configured to:
    in response to determining that the media signature matches more than one stored media signature, generate for display, for each matching stored media signature, a progress bar comprising an identifier of the respective content item associated with the respective stored media signature, a progress indicator of the progress bar corresponding to the respective timestamp associated with the respective stored media signature.

17. The system of item 14, wherein the control circuitry is further configured to:
    identify, during the playback of the content item, a second media signature corresponding to a second portion of the content item;
    determine whether the second media signature matches a second stored media signature; and
    in response to determining that the second media signature matches a second stored media signature, generate for display a second progress bar comprising the identifier of the content item associated with the second stored media signature, a progress indicator of the second progress bar corresponding to the timestamp associated with the second stored media signature.

18. The system of item 17, wherein the display of the second progress bar replaces display of the progress bar.

19. The system of item 17, wherein the display of the second progress bar is in addition to display of the progress bar.

20. The system of item 19, wherein the progress bar and the second progress bar are displayed in a scrollable area.

21. The system of item 14, wherein the control circuitry is further configured to:
display, during the playback of the content item, a second progress bar representing the total duration of the content item and including an indication of a current playback position, wherein the second progress bar comprises a plurality of sections, each section identifying a respective identified media signature.

22. The system of item 21, wherein each section of the plurality of sections has a start time and an end time, and wherein the control circuitry is further configured to:
determine that a progress indicator of the second progress bar is between the start time and the end time of a first section of the plurality of sections; and
in response to determining that the progress indicator of the second progress bar is between the start time and the end time of the first section, generate for display a third progress bar for a content item associated with the respective identified media signature corresponding to the first section.

23. The system of item 14, wherein the control circuitry is further configured to:
receive a selection of the progress bar; and
in response to receiving the selection of the progress bar, generate for display the respective content item beginning at the timestamp corresponding to the progress indicator.

24. The system of item 14, wherein the control circuitry is further configured to:
receive a selection of the progress bar; and
in response to receiving the selection of the progress bar, generate for display, within the selectable user interface element, at least one selectable option to perform an action selected from the group consisting of: sharing the respective content item on social media, liking the respective content item, disliking the respective content item, subscribing to a content provider associated with the respective content item, purchasing the respective content item, and adding the respective content item to a watch list.

25. The system of item 14, wherein the control circuitry is further configured to:
identify an end time at which the first portion of content ends;
determine whether at least a threshold period of time has passed since the end time; and
in response to determining that at least the threshold period of time has passed since the end time, remove display of the progress bar.

26. The system of item 14, wherein the control circuitry configured to generate, for the respective content item, at least one media signature for at least one portion of the respective content item is further configured to:
analyze characteristics of at least one media component of the respective content item beginning at a first timestamp;
determine that the characteristics of the respective content item beginning at a subsequent timestamp are different from the characteristics beginning at the first timestamp; and
identify as a signature the portion of the at least one media component between the first timestamp and the subsequent timestamp.

27. A system for dynamically generating content recommendations during playback of a content item, the system comprising:
means for identifying, during the playback of the content item, a media signature corresponding to a first portion of the content item;
determining whether the media signature matches any stored media signature of a plurality of stored media signatures; and
in response to determining that the media signature matches a stored media signature, generating for display a progress bar comprising the identifier of the content item associated with the stored media signature, a progress indicator of the progress bar corresponding to the timestamp associated with the stored media signature.

28. The system of item 27, further comprising:
means for, for each content item of a plurality of content items:
generating, for the respective content item, a media signature for a portion of the respective content item; and
storing the media signature in association with an identifier of the respective content item and a timestamp corresponding to a position in the respective content item at which the portion is located.

29. The system of item 27, further comprising:
means for, in response to determining that the media signature matches more than one stored media signature, generating for display, for each matching stored media signature, a progress bar comprising an identifier of the respective content item associated with the respective stored media signature, a progress indicator of the progress bar corresponding to the respective timestamp associated with the respective stored media signature.

30. The system of item 27, further comprising:
means for identifying, during the playback of the content item, a second media signature corresponding to a second portion of the content item;
means for determining whether the second media signature matches a second stored media signature; and
means for, in response to determining that the second media signature matches a second stored media signature, generating for display a second progress bar comprising the identifier of the content item associated with the second stored media signature, a progress indicator of the second progress bar corresponding to the timestamp associated with the second stored media signature.

31. The system of item 30, wherein the display of the second progress bar replaces display of the progress bar.

32. The system of item 30, wherein the display of the second progress bar is in addition to display of the progress bar.

33. The system of item 32, wherein the progress bar and the second progress bar are displayed in a scrollable area.

34. The system of item 27, further comprising:
   means for displaying, during the playback of the content item, a second progress bar representing the total duration of the content item and including an indication of a current playback position, wherein the second progress bar comprises a plurality of sections, each section identifying a respective identified media signature.

35. The system of item 34, wherein each section of the plurality of sections has a start time and an end time, the system further comprising:
   means for determining that a progress indicator of the second progress bar is between the start time and the end time of a first section of the plurality of sections; and
   means for, in response to determining that the progress indicator of the second progress bar is between the start time and the end time of the first section, generating for display a third progress bar for a content item associated with the respective identified media signature corresponding to the first section.

36. The system of item 27, further comprising:
   means for receiving a selection of the progress bar; and
   means for, in response to receiving the selection of the progress bar, generating for display the respective content item beginning at the timestamp corresponding to the progress indicator.

37. The system of item 27, further comprising:
   means for receiving a selection of the progress bar; and
   means for, in response to receiving the selection of the progress bar, generating for display, within the selectable user interface element, at least one selectable option to perform an action selected from the group consisting of: sharing the respective content item on social media, liking the respective content item, disliking the respective content item, subscribing to a content provider associated with the respective content item, purchasing the respective content item, and adding the respective content item to a watch list.

38. The system of item 27, further comprising:
   means for identifying an end time at which the first portion of content ends;
   means for determining whether at least a threshold period of time has passed since the end time; and
   means for, in response to determining that at least the threshold period of time has passed since the end time, removing display of the progress bar.

39. The system of item 27, wherein the means for generating, for the respective content item, at least one media signature for at least one portion of the respective content item comprises:
   means for analyzing characteristics of at least one media component of the respective content item beginning at a first timestamp;
   means for determining that the characteristics of the respective content item beginning at a subsequent timestamp are different from the characteristics beginning at the first timestamp; and
   means for identifying as a signature the portion of the at least one media component between the first timestamp and the subsequent timestamp.

40. A non-transitory computer-readable medium having non-transitory computer-readable instructions encoded thereon for dynamically generating content recommendations during playback of a content item that, when executed by control circuitry, cause the control circuitry to:
   identify, during the playback of the content item, a media signature corresponding to a first portion of the content item;
   determine whether the media signature matches any stored media signature of a plurality of stored media signatures in the memory; and
   in response to determining that the media signature matches a stored media signature, generate for display a progress bar comprising the identifier of the content item associated with the stored media signature, a progress indicator of the progress bar corresponding to the timestamp associated with the stored media signature.

41. The non-transitory computer-readable medium of item 40, wherein execution of the instructions further causes the control circuitry to:
   for each content item of a plurality of content items:
      generate, for the respective content item, a media signature for a portion of the respective content item; and
      store, in the memory, the media signature in association with an identifier of the respective content item and a timestamp corresponding to a position in the respective content item at which the portion is located.

42. The non-transitory computer-readable medium of item 40, wherein execution of the instructions further causes the control circuitry to:
   in response to determining that the media signature matches more than one stored media signature, generate for display, for each matching stored media signature, a progress bar comprising an identifier of the respective content item associated with the respective stored media signature, a progress indicator of the progress bar corresponding to the respective timestamp associated with the respective stored media signature.

43. The non-transitory computer-readable medium of item 40, wherein execution of the instructions further causes the control circuitry to:
   identify, during the playback of the content item, a second media signature corresponding to a second portion of the content item;
   determine whether the second media signature matches a second stored media signature; and
   in response to determining that the second media signature matches a second stored media signature, generate for display a second progress bar comprising the identifier of the content item associated with the second stored media signature, a progress indicator of the second progress bar corresponding to the timestamp associated with the second stored media signature.

44. The non-transitory computer-readable medium of item 43, wherein the display of the second progress bar replaces display of the progress bar.

45. The non-transitory computer-readable medium of item 43, wherein the display of the second progress bar is in addition to display of the progress bar.
46. The non-transitory computer-readable medium of item 45, wherein the progress bar and the second progress bar are displayed in a scrollable area.
47. The non-transitory computer-readable medium of item 40, wherein execution of the instructions further causes the control circuitry to:
    display, during the playback of the content item, a second progress bar representing the total duration of the content item and including an indication of a current playback position, wherein the second progress bar comprises a plurality of sections, each section identifying a respective identified media signature.
48. The non-transitory computer-readable medium of item 47, wherein each section of the plurality of sections has a start time and an end time, and wherein execution of the instructions further causes the control circuitry to:
    determine that a progress indicator of the second progress bar is between the start time and the end time of a first section of the plurality of sections; and
    in response to determining that the progress indicator of the second progress bar is between the start time and the end time of the first section, generate for display a third progress bar for a content item associated with the respective identified media signature corresponding to the first section.
49. The non-transitory computer-readable medium of item 40, wherein execution of the instructions further causes the control circuitry to:
    receive a selection of the progress bar; and
    in response to receiving the selection of the progress bar, generate for display the respective content item beginning at the timestamp corresponding to the progress indicator.
50. The non-transitory computer-readable medium of item 40, wherein execution of the instructions further causes the control circuitry to:
    receive a selection of the progress bar; and
    in response to receiving the selection of the progress bar, generate for display, within the selectable user interface element, at least one selectable option to perform an action selected from the group consisting of: sharing the respective content item on social media, liking the respective content item, disliking the respective content item, subscribing to a content provider associated with the respective content item, purchasing the respective content item, and adding the respective content item to a watch list.
51. The non-transitory computer-readable medium of item 40, wherein execution of the instructions further causes the control circuitry to:
    identify an end time at which the first portion of content ends;
    determine whether at least a threshold period of time has passed since the end time; and
    in response to determining that at least the threshold period of time has passed since the end time, remove display of the progress bar.
52. The non-transitory computer-readable medium of item 40, wherein execution of the instruction to generate, for the respective content item, at least one media signature for at least one portion of the respective content item, further causes the control circuitry to:
    analyze characteristics of at least one media component of the respective content item beginning at a first timestamp;
    determine that the characteristics of the respective content item beginning at a subsequent timestamp are different from the characteristics beginning at the first timestamp; and
    identify as a signature the portion of the at least one media component between the first timestamp and the subsequent timestamp.
53. A method for dynamically generating content recommendations during playback of a content item, the method comprising:
    accessing a content item for playback;
    identifying, during the playback of the content item, a media signature corresponding to a first portion of the content item;
    determining whether the media signature matches any stored media signature of a plurality of stored media signatures; and
    in response to determining that the media signature matches a stored media signature, generating for display a progress bar comprising the identifier of the content item associated with the stored media signature, a progress indicator of the progress bar corresponding to the timestamp associated with the stored media signature.
54. The method of item 53, further comprising:
    for each content item of a plurality of content items:
        generating, for the respective content item, a media signature for a portion of the respective content item; and
        storing the media signature in association with an identifier of the respective content item and a timestamp corresponding to a position in the respective content item at which the portion is located.
55. The method of any of items 53-54, further comprising:
    in response to determining that the media signature matches more than one stored media signature, generating for display, for each matching stored media signature, a progress bar comprising an identifier of the respective content item associated with the respective stored media signature, a progress indicator of the progress bar corresponding to the respective timestamp associated with the respective stored media signature.
56. The method of any of items 53-55, further comprising:
    identifying, during the playback of the content item, a second media signature corresponding to a second portion of the content item;
    determining whether the second media signature matches a second stored media signature; and
    in response to determining that the second media signature matches a second stored media signature, generating for display a second progress bar comprising the identifier of the content item associated with the second stored media signature, a progress indicator of the second progress bar corresponding to the timestamp associated with the second stored media signature.
57. The method of item 56, wherein the display of the second progress bar replaces display of the progress bar.
58. The method of item 56, wherein the display of the second progress bar is in addition to display of the progress bar.

59. The method of item 58, wherein the progress bar and the second progress bar are displayed in a scrollable area.

60. The method of any of items 53-59, further comprising:
displaying, during the playback of the content item, a second progress bar representing the total duration of the content item and including an indication of a current playback position, wherein the second progress bar comprises a plurality of sections, each section identifying a respective identified media signature.

61. The method of item 60, wherein each section of the plurality of sections has a start time and an end time, the method further comprising:
determining that a progress indicator of the second progress bar is between the start time and the end time of a first section of the plurality of sections; and
in response to determining that the progress indicator of the second progress bar is between the start time and the end time of the first section, generating for display a third progress bar for a content item associated with the respective identified media signature corresponding to the first section.

62. The method of any of items 53-61, further comprising:
receiving a selection of the progress bar; and
in response to receiving the selection of the progress bar, generating for display the respective content item beginning at the timestamp corresponding to the progress indicator.

63. The method of any of items 53-62, further comprising:
receiving a selection of the progress bar; and
in response to receiving the selection of the progress bar, generating for display, within the selectable user interface element, at least one selectable option to perform an action selected from the group consisting of: sharing the respective content item on social media, liking the respective content item, disliking the respective content item, subscribing to a content provider associated with the respective content item, purchasing the respective content item, and adding the respective content item to a watch list.

64. The method of any of items 53-63, further comprising:
identifying an end time at which the first portion of content ends;
determining whether at least a threshold period of time has passed since the end time; and
in response to determining that at least the threshold period of time has passed since the end time, removing display of the progress bar.

65. The method of any of items 53-64, wherein generating, for the respective content item, at least one media signature for at least one portion of the respective content item comprises:
analyzing characteristics of at least one media component of the respective content item beginning at a first timestamp;
determining that the characteristics of the respective content item beginning at a subsequent timestamp are different from the characteristics beginning at the first timestamp; and
identifying as a signature the portion of the at least one media component between the first timestamp and the subsequent timestamp.

What is claimed is:

1. A method for dynamically generating content recommendations during playback of a content item, the method comprising:
receiving the content item by a local device;
playing back the content item by the local device;
identifying, during the playback of the content item, a media signature corresponding to a first portion of the content item;
determining whether the media signature matches any media signature of a plurality of media signatures stored on the local device or remotely;
in response to determining that the media signature corresponding to the first portion of the content item matches a stored media signature:
identifying a timestamp of the content item associated with the stored media signature that corresponds to the media signature of the first portion of the content item played back by the local device; and
generating for display by the local device a progress bar comprising an identifier of the content item associated with the stored media signature and a progress indicator of the progress bar corresponding to the identified timestamp; and
receiving a selection of the progress bar; and
in response to receiving the selection of the progress bar, generating for display by the local device the respective content item beginning at the timestamp corresponding to the progress indicator.

2. The method of claim 1, further comprising:
for each content item of a plurality of content items:
generating, for the respective content item, a media signature for a portion of the respective content item; and
storing the media signature in association with an identifier of the respective content item and a timestamp corresponding to a position in the respective content item at which the portion is located.

3. The method of claim 1, further comprising:
in response to determining that the media signature matches more than one stored media signature, generating for display, for each matching stored media signature, a progress bar comprising an identifier of the respective content item associated with the respective stored media signature and a progress indicator of the progress bar corresponding to the respective timestamp associated with the respective stored media signature.

4. The method of claim 1, further comprising:
identifying, during the playback of the content item, a second media signature corresponding to a second portion of the content item;
determining whether the second media signature matches a second stored media signature; and
in response to determining that the second media signature matches a second stored media signature, generating for display a second progress bar comprising the identifier of the content item associated with the second stored media signature, a progress indicator of the second progress bar corresponding to the timestamp associated with the second stored media signature.

5. The method of claim 4, wherein the display of the second progress bar replaces display of the progress bar.

6. The method of claim 4, wherein the display of the second progress bar is in addition to display to the progress bar.

7. The method of claim 6, wherein the progress bar and the second progress bar are displayed in a scrollable area.

8. A method for dynamically generating content recommendations during playback of a content item, the method comprising:

receiving the content item by a local device;
playing back the content item by the local device;
identifying, during the playback of the content item, a media signature corresponding to a first portion of the content item;
determining whether the media signature matches any media signature of a plurality of media signatures stored on the local device or remotely;
in response to determining that the media signature corresponding to the first portion of the content item matches a stored media signature:
 identifying a timestamp of the content item associated with the stored media signature that corresponds to the media signature of the first portion of the content item played back by the local device; and
 generating for display by the local device a progress bar comprising an identifier of the content item associated with the stored media signature and a progress indicator of the progress bar corresponding to the identified timestamp; and
displaying, during the playback of the content item, a second progress bar representing the total duration of the content item and including an indication of a current playback position, wherein the second progress bar comprises a plurality of sections, each section identifying a respective identified media signature.

9. The method of claim 8, wherein each section of the plurality of sections has a start time and an end time, the method further comprising:
determining that a progress indicator of the second progress bar is between the start time and the end time of a first section of the plurality of sections; and
in response to determining that the progress indicator of the second progress bar is between the start time and the end time of the first section, generating for display a third progress bar for a content item associated with the respective identified media signature corresponding to the first section.

10. A system for dynamically generating content recommendations during playback of a content item, the system comprising:
memory; and
control circuitry configured to:
 receive the content item by a local device;
 play back the content item by the local device;
 identify, during the playback of the content item, a media signature corresponding to a first portion of the content item;
 determine whether the media signature matches any media signature of a plurality of stored media signatures in the memory or remotely; and
 in response to determining that the media signature matches a stored media signature:
  identify a timestamp of the content item associated with the stored media signature that corresponds to the media signature of the first portion of the played back content item; and
  generate for display by the local device a progress bar comprising an identifier of the content item associated with the stored media signature, a progress indicator of the progress bar corresponding to the identified timestamp; and
 receive a selection of the progress bar; and
 in response to receiving the selection of the progress bar, generating for display by the local device the respective content item beginning at the timestamp corresponding to the progress indicator.

11. The system of claim 10, wherein the control circuitry is further configured to:
for each content item of a plurality of content items:
 generate, for the respective content item, a media signature for a portion of the respective content item; and
 store, in the memory, the media signature in association with an identifier of the respective content item and a timestamp corresponding to a position in the respective content item at which the portion is located.

12. The system of claim 10, wherein the control circuitry is further configured to:
in response to determining that the media signature matches more than one stored media signature, generate for display, for each matching stored media signature, a progress bar comprising an identifier of the respective content item associated with the respective stored media signature, a progress indicator of the progress bar corresponding to the respective timestamp associated with the respective stored media signature.

13. The system of claim 10, wherein the control circuitry is further configured to:
identify, during the playback of the content item, a second media signature corresponding to a second portion of the content item;
determine whether the second media signature matches a second stored media signature; and
in response to determining that the second media signature matches a second stored media signature, generate for display a second progress bar comprising the identifier of the content item associated with the second stored media signature, a progress indicator of the second progress bar corresponding to the timestamp associated with the second stored media signature.

14. The system of claim 13, wherein the display of the second progress bar replaces display of the progress bar.

15. The system of claim 13, wherein the display of the second progress bar is in addition to display to the progress bar.

16. The system of claim 15, wherein the progress bar and the second progress bar are displayed in a scrollable area.

17. The system of claim 10, wherein the control circuitry is further configured to:
display, during the playback of the content item, a second progress bar representing the total duration of the content item and including an indication of a current playback position, wherein the second progress bar comprises a plurality of sections, each section identifying a respective identified media signature.

18. The system of claim 17, wherein each section of the plurality of sections has a start time and an end time, wherein the control circuitry is further configured to:
determine that a progress indicator of the second progress bar is between the start time and the end time of a first section of the plurality of sections; and
in response to determining that the progress indicator of the second progress bar is between the start time and the end time of the first section, generate for display a third progress bar for a content item associated with the respective identified media signature corresponding to the first section.

* * * * *